(12) United States Patent
Kim et al.

(10) Patent No.: US 10,237,544 B2
(45) Date of Patent: Mar. 19, 2019

(54) OPEN HEAD MOUNT DISPLAY DEVICE AND DISPLAY METHOD THEREOF

(71) Applicant: BOE TECHNOLOGY GROUP CO., LTD., Beijing (CN)

(72) Inventors: Heecheol Kim, Beijing (CN); Youngsuk Song, Beijing (CN); Seongyeol Yoo, Beijing (CN); Seungjin Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 365 days.

(21) Appl. No.: 14/415,651

(22) PCT Filed: Apr. 21, 2014

(86) PCT No.: PCT/CN2014/075812
§ 371 (c)(1),
(2) Date: Jan. 19, 2015

(87) PCT Pub. No.: WO2015/085692
PCT Pub. Date: Jun. 18, 2015

(65) Prior Publication Data
US 2016/0007015 A1    Jan. 7, 2016

(30) Foreign Application Priority Data
Dec. 12, 2013   (CN) .......................... 2013 1 0682435

(51) Int. Cl.
*G06T 1/00*     (2006.01)
*G09G 3/20*    (2006.01)
(Continued)

(52) U.S. Cl.
CPC .......... *H04N 13/398* (2018.05); *G02B 27/01* (2013.01); *G02B 27/017* (2013.01);
(Continued)

(58) Field of Classification Search
CPC .................. G02B 27/01; G02B 27/017; G02B 2027/0178; G02B 2027/0138;
(Continued)

(56) References Cited

U.S. PATENT DOCUMENTS 6,525,699 B1 *    2/2003   Suyama   ............. G02B 27/2278
                                                    345/419
2001/0019450 A1 *  9/2001   Ogino    .................. H04N 13/021
                                                    359/462
(Continued)

FOREIGN PATENT DOCUMENTS

CN          101930125 A       12/2010
CN          102937745 A        2/2013
(Continued)

OTHER PUBLICATIONS

Notification of the Second Office Action dated Jan. 18, 2016 corresponding to Chinese application No. 201310682435.4.
(Continued)

*Primary Examiner* — Charles V Hicks
(74) *Attorney, Agent, or Firm* — Nath, Goldberg & Meyer; Joshua B. Goldberg; Daniel Bissing

(57) ABSTRACT

The present invention provides an open head mount display device and a display method thereof, relates to the field of head mount display technology, and can solve technical problems (such as a tedious operation, a poor display effect, an inaccurate position of the display image or the like) of the open head mount display device in the prior art. The open head mount display device of the present invention comprises: a display unit for providing a display image to user's eyes; an image acquisition unit for acquiring an image of an external object; an image analysis unit for analyzing and determining a position of the external object relative to the user's eyes in accordance with the image acquired by the image acquisition unit; and an image adjusting unit for
(Continued)

adjusting the display image in accordance with an analysis result of the image analysis unit.

13 Claims, 4 Drawing Sheets

(51) Int. Cl.
G09G 3/36 (2006.01)
G02B 27/01 (2006.01)
H04N 13/30 (2018.01)
H04N 5/232 (2006.01)
H04N 5/335 (2011.01)
H04N 13/344 (2018.01)
H04N 13/398 (2018.01)

(52) U.S. Cl.
CPC ............ G06T 1/0007 (2013.01); G09G 3/20 (2013.01); G09G 3/36 (2013.01); H04N 5/23293 (2013.01); H04N 5/335 (2013.01); G02B 2027/014 (2013.01); G02B 2027/0132 (2013.01); G02B 2027/0138 (2013.01); G02B 2027/0178 (2013.01); G02B 2027/0187 (2013.01); H04N 13/344 (2018.05); H04N 2013/405 (2018.05)

(58) Field of Classification Search
CPC ...... G02B 2027/014; G02B 2027/0187; G09G 3/20; G09G 3/36; H04N 5/23293; H04N 13/0497; H04N 13/044; H04N 5/335; H04N 2013/0465; G06T 1/0007
See application file for complete search history.

(56) References Cited

U.S. PATENT DOCUMENTS

| 2002/0167589 | A1* | 11/2002 | Schofield | B60N 2/002 |
| | | | | 348/148 |
| 2003/0214724 | A1* | 11/2003 | Fujikawa | G02B 27/0101 |
| | | | | 359/630 |
| 2004/0212776 | A1 | 10/2004 | Spitzer et al. | |
| 2009/0289956 | A1 | 11/2009 | Douris et al. | |
| 2011/0075257 | A1* | 3/2011 | Hua | G02B 27/017 |
| | | | | 359/464 |
| 2012/0274745 | A1 | 11/2012 | Russell | |
| 2013/0021373 | A1* | 1/2013 | Vaught | G02B 27/017 |
| | | | | 345/633 |
| 2013/0241805 | A1 | 9/2013 | Gomez | |
| 2014/0139453 | A1* | 5/2014 | Yu | G02B 27/017 |
| | | | | 345/173 |

FOREIGN PATENT DOCUMENTS

| CN | 102944935 A | 2/2013 |
| CN | 202735594 U | 2/2013 |
| CN | 102980556 A | 3/2013 |
| CN | 103309034 A | 9/2013 |
| CN | 103344213 A | 10/2013 |
| CN | 103698884 A | 4/2014 |
| WO | 2010103955 A1 | 9/2010 |

OTHER PUBLICATIONS

Form PCT/ISA/237 issued in International application No. PCT/CN2014/075812 dated Sep. 22, 2014.
1st Office Action issued in Chinese application No. 201310682435.4 dated Jul. 3, 2015.
International Search Report dated Apr. 21, 2014 from application No. PCT/CN2014/075812.

* cited by examiner contour image of the image acquired by the left image acquisition unit contour image of the image acquired by the right image acquisition unit superimposed image contours of the same external objects in the superimposed image coincide with each other

OPEN HEAD MOUNT DISPLAY DEVICE AND DISPLAY METHOD THEREOF

This is a National Phase Application filed under 35 U.S.C. 371 as a national stage of PCT/CN2014/075812, filed Apr. 21, 2014, an application claiming the benefit of Chinese Application No. 201310682435.4, filed Dec. 12, 2013, the content of each of which is hereby incorporated by reference in its entirety.

TECHNICAL FIELD

The present invention relates to the field of head mount display technology, and in particular, relates to an open head mount display device and a display method thereof.

BACKGROUND ART

An open head mount display (HMD) device is also referred to as a glasses display device, which is wore in front of user's eyes in a similar way to wear a helmet or glasses so that the user can simultaneously see an external object 91 and a display image 92, as shown in FIG. 1.

As shown in FIG. 2, an existing open head mount display device comprises a display unit 1 for displaying an image for user's eyes 8. Preferably, two display units 1 are provided and used for respectively providing different display images for the user's eyes 8 so that a 3D display is achieved. The display unit 1 generally comprises a display (e.g., liquid crystal display) 11 and a focusing lens unit 12, wherein the display 11 is used for generating a display image, the focusing lens unit 12 is used for adjusting an object distance of the display image with respect to the user's eyes 8, that is, for changing light divergence degree of the display image, so that the display image is "simulated" as an image displayed far away from the user's eyes 8, thus enabling the user to view the display image comfortably, and the object distance of the display image 92 with respect to the user's eyes 8 is equal to an object distance of the external object 91 with respect to the user's eyes 8, thus ensuring that the user can simultaneously see the display image 92 and the external object 91 clearly. The focusing lens unit 12 generally comprises one or more focusing lenses. The object distance of the display image 92 with respect to the user's eyes 8 may be changed by adjusting positions of the focusing lenses whose the specific structure and the adjustment method have been known in the art and will not be described in detail here. In addition, in order to save space, the display 11 is generally provided at two sides of the user's eyes 8 (e.g., in temples of glasses). In this case, the display image 92 should be reflected into the user's eyes 8 by a reflection unit. The reflection unit may be composed of a series of reflection lenses, and the reflection lens located in front of the user's eyes 8 is a transflective lens 21, so that the user is allowed to see the external object 91 while the display image 92 is reflected.

The inventor founds that there are at least following problems for the existing open head mount display device.

First, in the existing open head mount display device, the object distance of the display image 92 with respect to the user's eyes 8 is determined in a manual adjusting manner, resulting in a tedious operation, a poor accuracy, a poor timeliness and a poor display effect.

Secondly, in many cases, the display image 92 is related to the external object 91 (e.g., the display image is an illustration for the external object), this requires that the display image 92 and the external object 91 satisfy specific relationship between positions thereof (e.g., the display image is positioned just beside the external object). However, in the existing open head mount display device, since the position of the external object 91 cannot be determined, the display image 92 only can be displayed at a default position (which refers to a position of the display image in a plane with a same distance from the user's eyes, rather than the object distance of the display image with respect to the user's eyes), but this position (e.g., any position in "up, down, left or right" direction) of the display image 92 in the plane with the same distance from the user's eyes 8 may be not appropriate (for example, the illustration for a certain external object may be far away from the external object).

Thirdly, angles between sight lines of the user's two eyes are different when the user views external objects 92 at different distances, wherein, when the user views the external object 92 at a far distance, the sight lines of the user's two eyes are almost parallel to each other, and the closer the external object 92 is, the larger the angle between the sight lines of the user's two eyes is. However, positions of display images provided by the two display units for left and right eyes are fixed, which results that, when the positions of the display images for left and right eyes do not match the angle between the sight lines of the user's eyes, the display images for left and right eyes displayed by the two display units cannot exactly coincide with each other after subjected to user's brain treatment, and there is a ghost in the user's eyes.

SUMMARY

In view of technical problems (such as a tedious operation, a poor display effect, an inaccurate position of the display image or the like) of the open head mount display device in the prior art, the present invention provides an open head mount display device and a display method thereof which can achieve a simple operation, a good display effect and an accurate position of the display image.

A technical solution of the present invention is an open head mount display device, comprising: a display unit for providing a display image to user's eyes; an image acquisition unit for acquiring an image of an external object; an image analysis unit for analyzing and determining a position of the external object relative to the user's eyes in accordance with the image acquired by the image acquisition unit; and an image adjusting unit for adjusting the display image in accordance with an analysis result of the image analysis unit.

Preferably, two image acquisition units are provided for acquiring images in a same direction, and the image analysis unit is used for superimposing two contour images with each other in specific positions, then moving at least one of the contour images so that contours of the same external object in the two contour images coincide with each other, and determining a distance from the external object to the user's eyes in accordance with a moving distance of the contour image, wherein the contour images are obtained by performing a contour process on two images acquired at the same time by the two image acquisition units.

Preferably, the image adjusting unit is used for adjusting an object distance of the display image with respect to the user's eyes in accordance with the analysis result of the image analysis unit so that the object distance of the display image with respect to the user's eyes is equal to the distance from the external object to the user's eyes.

Preferably, the image adjusting unit is used for adjusting a position of the display image in accordance with the analysis result of the image analysis unit.

Preferably, the image acquisition unit directly acquires the image of the external object.

Preferably, the open head mount display device further comprises a reflection unit for reflecting the display image generated by the display unit into the user's eyes, wherein the reflection unit comprises a transflective lens provided in front of the user's eyes. Further preferably, the image acquisition unit acquires an image of the external object reflected by the transflective lens.

Preferably, the image acquisition unit is provided at each side of the user's eyes or at a position between the user's two eyes.

Preferably, two display units are provided for generating display images entering into user's left and right eyes respectively.

Another technical solution of the present invention is a display method of an open head mount display device, wherein, in the process of providing a display image to user's eyes by a display unit, the display method comprises following steps of: acquiring an image of an external object by an image acquisition unit; analyzing and determining a position of the external object with respect to the user's eyes in accordance with the image acquired by the image acquisition unit through an image analysis unit; and adjusting the display image in accordance with an analysis result of the image analysis unit by an image adjusting unit.

Preferably, the step of acquiring the image of the external object by the image acquisition unit comprises: acquiring images in a same direction at the same time by two image acquisition units. The step of analyzing and determining the position of the external object relative to the user's eyes in accordance with the image acquired by the image acquisition unit through the image analysis unit comprises: superimposing two contour images with each other in specific positions by the image analysis unit, then moving at least one of the contour images so that contours of the same external object in the two contour images coincide with each other, and determining a distance from the external object to the user's eyes in accordance with a moving distance of the contour image, wherein the contour images are obtained by performing a contour process on two images acquired at the same time by the two image acquisition units.

Preferably, the step of adjusting the display image in accordance with the analysis result of the image analysis unit by the image adjusting unit comprises: adjusting an object distance of the display image with respect to the user's eyes in accordance with the analysis result of the image analysis unit by the image adjusting unit so that the object distance of the display image with respect to the user's eyes is equal to the distance from the external object to the user's eyes.

Preferably, the step of adjusting the display image in accordance with the analysis result of the image analysis unit by the image adjusting unit comprises: adjusting a position of the display image in accordance with the analysis result of the image analysis unit by the image adjusting unit.

The "display image" refers to an image generated by the display unit and provided to the user. The "adjusting an object distance of the display image with respect to the user's eyes" refers to changing light divergence degree of the display image so that the display image is "simulated" as an image displayed at various distances from the user's eyes, and the distance from the simulated image to the user's eyes is the object distance of the display image with respect to the user's eyes. The "focal distance of user's eyes" refers to the distance between the user's eyes and the focus thereof, that is, the distance between the user's eyes and the external object that the user is looking at.

In the open head mount display device and the display method thereof according to the present invention, the position (including distance, angle etc.) of the external object relative to the user's eyes can be determined by analyzing the image of the external object, thus the focal distance of the user's eyes and the angle between sight lines of the user's eyes also can be determined (since the user is looking at the external object), thereby the display image may be adjusted automatically so that the object distance of the display image with respect to the user's eyes, the position of the display image and the like match with the focal distance of the user's eyes, the angle between sight lines of the user's eyes and the like at any time to ensure the user can see clearly the external object and the display image simultaneously at any time, resulting in a simple operation and a good display effect, meanwhile, a proper relative relationship between positions of the display image and the external object in the user's eyes also can be ensured, and display images for left and right eyes can exactly coincide with each other, that is, the position of the display image is accurate.

Figure 1:
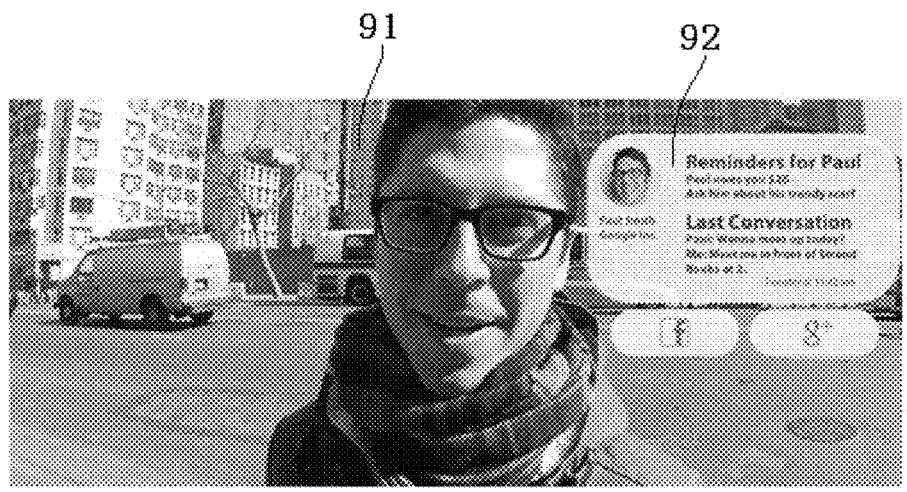
FIG. 1 shows a diagram of display effect of an open head mount display device.
Figure 2:
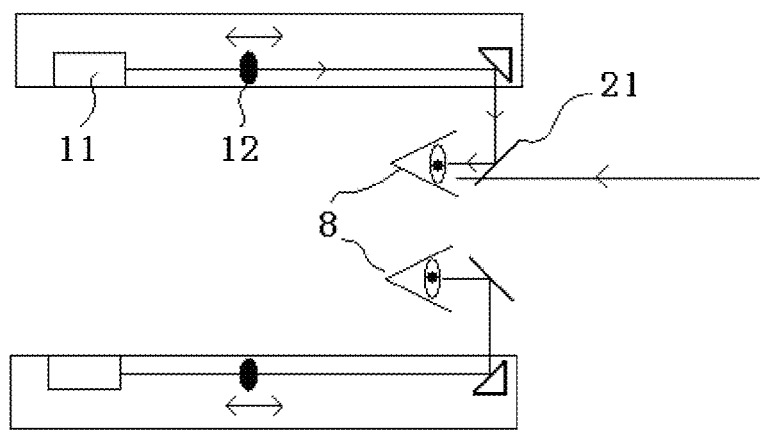
FIG. 2 shows a structure diagram of an open head mount display device in the prior art.

REFERENCE SIGNS 1, display unit; 11, display; 12, focusing lens unit; 2, image adjusting unit; 21, transflective lens; 3, image analysis unit; 4, image acquisition unit; 8, user's eyes; 91, external object; 92, display image.

DETAILED DESCRIPTION OF THE PREFERRED EMBODIMENTS

In order to make skilled persons in the art better understand the technical solutions of the present invention, the present invention will be further described in detail below with reference to the drawings and specific embodiments.

First Embodiment

The present embodiment provides an open head mount display device, as shown in FIGS. 3 to 6, comprising an image acquisition unit 4, an image analysis unit 3, an image adjusting unit 2, a display unit 1, and preferably further comprising a reflection unit.

The display unit 1 is used for providing a display image 92 to user's eyes 8, and comprises a display 11 and a focusing lens unit 12.

The display 11 is used for generating the display image 92, and may be any type of display such as a liquid crystal display, an organic light emitting diode display or the like. The focusing lens unit 12 is composed of one or more focusing lenses, and can change divergence degree of the light passing through itself so that the object distance of the display image 92 with respect to the user's eyes 8 is adjusted, that is, the display image 92 is "simulated" as an image displayed at a position with a certain distance from the user's eyes 8.

Preferably, two display units 1 are provided and used for providing display images 92 for the user's left and right eyes respectively so that a 3D display is achieved.

Preferably, in order to save space, the display unit 1 is provided in each of two side parts of the open head mount display device (e.g., in temples of glasses). In this case, display surface of the display unit 1 is not towards the user's eyes 8, and the display image 92 cannot directly enter into the user's eyes 8 either. Thus, in this case, a reflection unit is needed to reflect the display image generated by the display unit 1 into the user's eyes 8. The reflection unit may be composed of a series of reflection lenses, and wherein, the reflection lens located in front of the user's eyes 8 is a transflective lens 21. The transflective lens 21 is a conventional optical element, and it can both reflect part (e.g., 30%) of light and allow part (e.g., 70%) of light to pass through itself, so that the user is allowed to see the external object 91 while the display image 92 is reflected into the user's eyes 8.

The image acquisition unit 4 is used for acquiring an image of the external object 91.

Preferably, the image acquisition unit 4 may be a charge coupled device (CCD) camera or the like.

Figure 3:
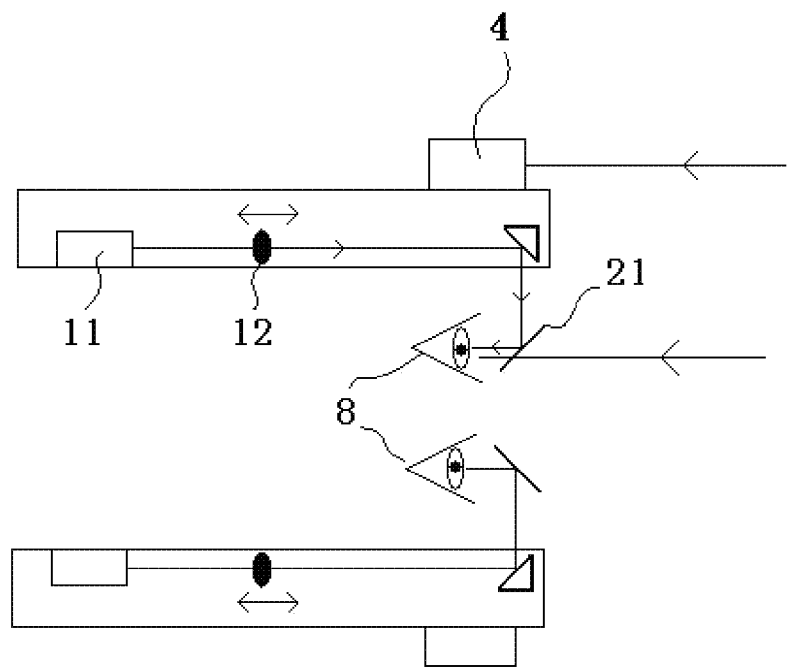
FIG. 3 shows a structure diagram of an open head mount display device in accordance with a first embodiment of the present invention.

Preferably, as shown in FIG. 3, the image acquisition unit 4 also may be provided at two sides of the user's eyes 8 (e.g., in temples of glasses). Alternatively, as another implementation of the present embodiment, as shown in FIG. 4, the image acquisition unit 4 may be provided at a position between the user's two eyes.

Preferably, as shown in FIG. 3, the image acquisition unit 4 directly acquires the image of the external object 91. That is, as shown in FIG. 3, the image acquisition unit 4 can directly face towards the external object, so that the image of the external object 91 can be acquired without being reflected.

Figure 4:
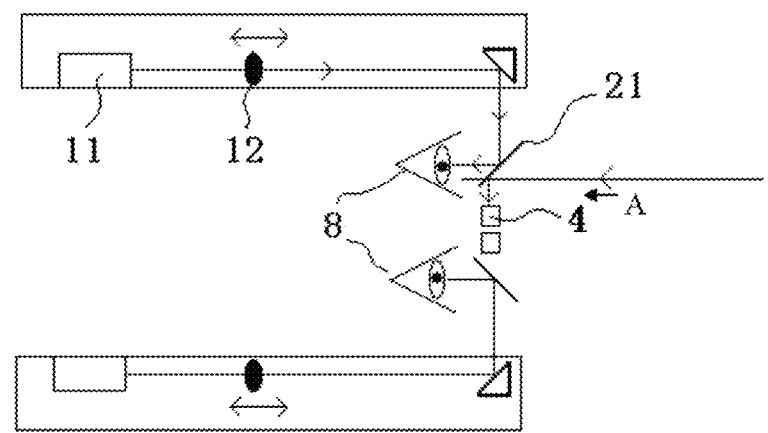
FIG. 4 shows a structure diagram of another open head mount display device in accordance with the first embodiment of the present invention.

Alternatively, as another implementation of the present embodiment, as shown by a direction A in FIG. 4, when there is a transflective lens 21, the image acquisition unit 4 also can acquire the image of the external object 91 reflected by the transflective lens 21. That is to say, since the transflective lens 21 has both functions of reflection and transmission, it will reflect light from the external object 91 so that the image acquisition unit 4 also can acquire the image of the external object 91 reflected by the transflective lens 21.

In a word, the image acquisition unit 4 may be of diverse forms and may be provided at different positions. Further, the image acquisition unit 4 can either directly acquire an image or acquire a reflected image. There may be one or two image acquisition units 4, as long as it can acquire the image of the external object 91.

The image analysis unit 3 is used for determining a position (including distance and angle, i.e., the focal distance of the user's eyes and the angle between sight lines of the user's eyes) of the external object 91 relative to the user's eyes 8 in accordance with the image acquired by the image acquisition unit 4. Since the user's eyes 8 are looking at the external object, the determination of the position of the external object 91 relative to the user's eyes 8 is equivalent to the determination of the focal distance of the user's eyes 8. Meanwhile, the angle between sight lines of the user's eyes is also related to the distance from the user's eyes to the external object 91 seen by the user's eyes. When the external object 91 is far away from the user's eyes 8, the sight lines of the user's eyes are almost parallel to each other. The closer the external object 91 is, the larger the angle between sight lines of the user's eyes is, thus the angle between sight lines of the user's eyes 8 may be determined in accordance with the position (distance) of the external object 91 relative to the user's eyes 8.

Specifically, there are diverse methods of determining the position of the external object 91 relative to the user's eyes 8 in accordance with the image of the external object 91.

For example, when the distance between the external object 91 and the user's eyes 8 (specifically, the distance can be considered as the minimum distance between the external object and the mid-point between the user's two eyes) is to be determined, an automatic focusing may be performed on the image acquisition unit 4, and then to determine whether the image acquired by the image acquisition unit 4 is clear or not, when the image is clear, it indicates that the distance between the external object 91 and the image acquisition unit 4 is equal to the focal distance of the image acquisition unit 4 at this time. Further, since the relative positions of the image acquisition unit 4 and the user's eyes 8 are known, the distance between the external object 91 and the user's eyes 8 can be obtained.

Alternatively, a contour analysis technique may be used for determining what external object the acquired image contains (e.g., it is determined that the acquired image is an image of a person), then the distance between the external object 91 and the user's eyes 8 is determined in accordance with relationship between the pre-stored normal dimension of the external object (e.g., it may be considered that the person has a height of 1.7 meters) and the dimension of the external object 91 in the acquired image.

Preferably, if two image acquisition units 4 are provided and used for acquiring images in a same direction (i.e., two image acquisition units 4 are towards the same direction), the procedure of determining the distance between the external object 91 and the user's eyes 8 may be as follows: superimposing two contour images with each other in specific positions (e.g., edges of the two contour images are made coincide with each other) by the image analysis unit 3, then moving at least one of the contour images so that contours of the same external object in the two contour images coincide with each other, and determining a distance from the external object 91 to the user's eyes 8 in accordance with a moving distance of the contour image, wherein the contour images are obtained by performing a contour process on two images acquired at the same time by the two image acquisition units 4.

Figure 5:
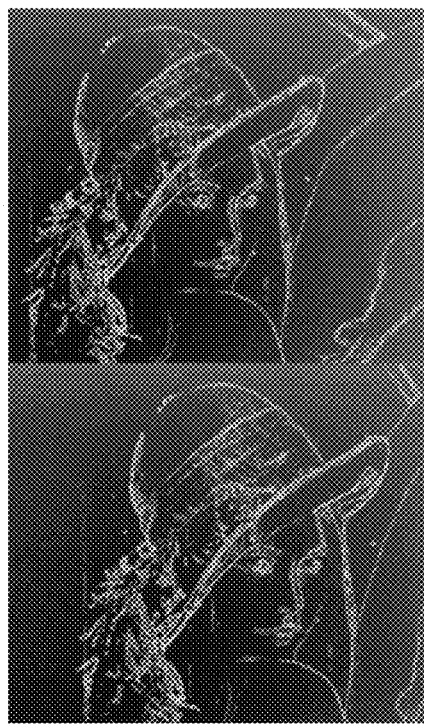
FIG. 5 shows a principle diagram of superimposing and moving acquired images by the open head mount display device in accordance with the first embodiment of the present invention.
Figure 5:
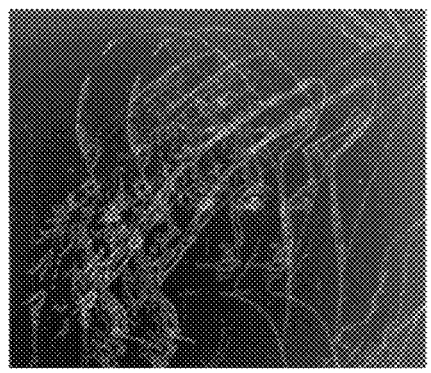
Figure 5:
Figure 6:
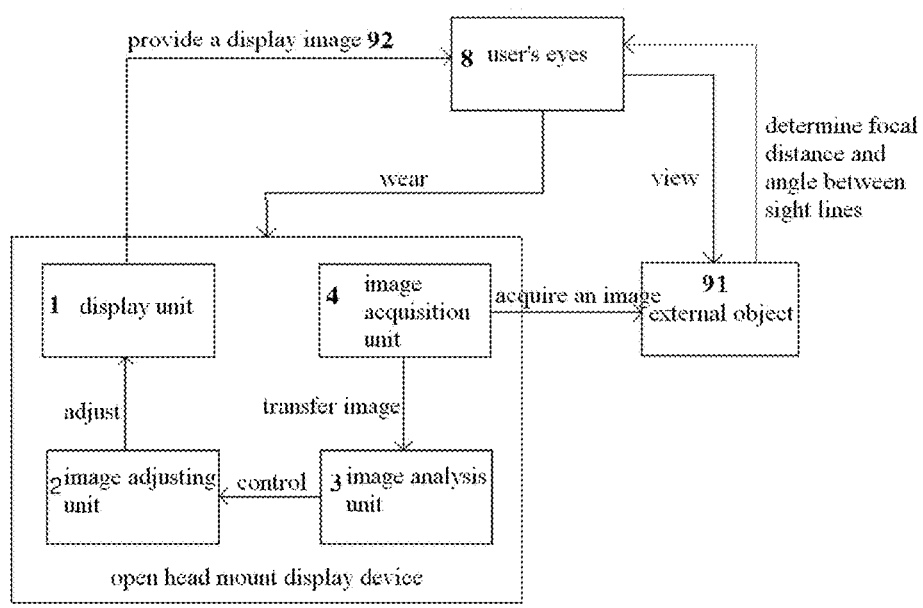
FIG. 6 shows a configuration diagram of the open head mount display device in accordance with the first embodiment of the present invention.

Specifically, as shown in FIG. 5, when two image acquisition units 4 acquire images in the same direction, the two images respectively acquired by the left and right image acquisition units 4 should be similar but not the same, the differences therebetween result from that positions of the same external object 91 in the two images are different from each other, and there are slight differences in appearance of the same external object 91 in the two images due to different shooting angles. The farther the external object 91 is from the image acquisition unit 4, the smaller the difference between positions of the external object 91 in the two images acquired by the two image acquisition units 4 will be, and the closer the external object 91 is from the image acquisition unit 4, the larger the difference between positions of the external object 91 in the two images acquired by the two image acquisition units 4 will be. Therefore, as shown in FIG. 5, first, a contour process is performed on the two images respectively acquired by the left and right image acquisition units 4, that is, the two images respectively acquired by the left and right image acquisition units 4 are converted into a form of "lines", so that the differences in appearance of the same external object 91 in the two images due to different shooting angles are eliminated, at this time, the contour lines of the same external object in the two contour images are (almost) the same, but the positions thereof in the two contour images are different from each other. For this reason, as shown in FIG. 5, when the two contour images are superimposed with each other in specific positions (e.g., edges of the two contour images are made coincide with each other), there is a "ghost" in the superimposed image because the positions of the same external object 91 in the two images are different from each other. Then, as shown in FIG. 5, at least one of the contour images is gradually moved (one or two contour images may be moved) until the contours of the same external object 91 in the two contour images coincide with each other (i.e., the ghost disappears). Obviously, the moving distance represents the difference between positions of the same external object 91 in the two images. As described above, the difference between positions of the same external object 91 in the two images is related to the distance from the external object 91 to the image acquisition unit 4. Thus, the distance from the external object 91 to the user's eyes 8 can be determined in accordance with the moving distance.

Meanwhile, the angle between the external object 91 and the user's eyes 8 may be determined in accordance with the position of the external object 91 in the image (e.g., whether the external object 91 is located at the middle or the upper left part), which will be not described in detail here.

Of course, there may be many external objects 91 in the image acquired by the image acquisition unit 4, and in this case, a primary external object 91 (in other words, the external object that the user is looking at) may be determined by an image analysis technique.

The image adjusting unit 2 is used for adjusting the display image 92 in accordance with an analysis result of the image analysis unit 3.

As described above, a position (including distance and angle) of the external object 91 relative to the user's eyes 8 may be determined in accordance with the image acquired by the image acquisition unit 4, i.e., the focal distance of the user's eyes 8 and the angle between sight lines of the user's eyes 8 can be determined. Thus, the image adjusting unit 2 can be used for adjusting the display image 92 in accordance with the above analysis result so that current statuses of the display image 92 and the user's eyes 8 match with each other.

Preferably, the object distance of the display image 92 with respect to the user's eyes 8 may be adjusted in accordance with the analysis result of the image analysis unit 3 by the image adjusting unit 2, so that the object distance of the display image 92 with respect to the user's eyes 8 is equal to the distance from the external object 91 to the user's eyes 8.

That is to say, when the distance from the external object 91 to the user's eyes 8 (i.e., the object distance of the external object 91 with respect to the user's eyes 8) is determined by the image analysis unit 3, the focal distance of the user's eyes 8 is equal to the object distance of the external object 91 with respect to the user's eyes 8. Therefore, the object distance of the display image 92 with respect to the user's eyes 8 may be automatically adjusted by the image adjusting unit 2, so that it is equal to the object distance of the external object 91 with respect to the user's eyes 8. That is, the object distance of the display image 92 with respect to the user's eyes 8, the object distance of the external object 91 with respect to the user's eyes 8 and the focal distance of the user's eyes 8 are equal to each other, and thus it is ensured that the user can simultaneously see the display image 92 and the external object 91 clearly without manual adjustment, resulting in a simple adjustment operation and a good display effect.

Specifically, the object distance of the display image 92 with respect to the user's eyes 8 may be changed by adjusting the focusing lens unit 12, for example, positions of a part of focusing lenses in the focusing lens unit 12 may be adjusted, or position of the whole focusing lens unit 12 may be adjusted, etc. Specific adjustment methods are known in the art, and thus will not be described in detail here.

Preferably, the image adjusting unit 2 may also be used for adjusting the position of the display image 92 in accordance with the analysis result of the image analysis unit 3.

In this embodiment, the "position of the display image" refers to different positions of the display image 92 in "up, down, left and right" directions in a plane with a same distance from the user's eyes 8, but does not include "simulated distance" from the display image 92 to the user's eyes 8, wherein the "simulated distance" is the object distance of the display image 92 with respect to the user's eyes 8.

That is to say, as an aspect, when the angle between the external object 91 and the user's eyes 8 is analyzed and determined by the image analysis unit 3, as long as the position of the display image 92 is adjusted appropriately by the image adjusting unit 2, the relationship between positions of the display image 92 and the external object 91 may be proper (for example, the illustration for a certain external object is just located beside the external object).

As another aspect, since angles between sight lines of the user' eyes 8 are different when the user views objects at different distances, the relative positions of the display images for left and right eyes displayed by the two display units 1 respectively also may be adjusted, so that the relative positions thereof and the angle between sight lines of the user's eyes 8 match with each other, and the two display images can be treated as one display image by user's brain, thus the user will feel like what he sees is one display image and occurrence of the ghost is avoided.

Specifically, there are many methods for adjusting the position of the display image, for example, the content displayed by the display 11 may be adjusted (e.g., the whole content displayed by the display 11 may be shifted by several pixels), or the reflection lens in the reflection unit may be rotated, so that the position of the display image 92 entering into the user's eyes 8 is changed. These methods are known in the art, and thus will not be described in detail here.

Of course, it should be understood that, one or both of the object distance and the position of the display image may be adjusted.

Second Embodiment

The present embodiment provides a display method of an open head mount display device, wherein, in the process of providing the display image 92 to the user's eyes 8 by the display unit 1, the display method comprises following steps of: acquiring, by the image acquisition unit 4, the image of the external object 91; analyzing and determining, by the image analysis unit 3, the position of the external object 91 relative to the user's eyes 8 in accordance with the image acquired by the image acquisition unit 4; and adjusting, by the image adjusting unit 2, the display image 92 in accordance with the analysis result of the image analysis unit 3.

Preferably, the step of acquiring, by the image acquisition unit 4, the image of the external object 91 comprises: acquiring images in a same direction at the same time by two image acquisition units 4. The step of analyzing and determining, by the image analysis unit 3, the position of the external object 91 relative to the user's eyes 8 in accordance with the image acquired by the image acquisition unit 4 comprises: superimposing two contour images with each other in specific positions (e.g., edges of the two contour images are made coincide with each other) by the image analysis unit 3, then moving at least one of the contour images so that contours of the same external object 91 in the two contour images coincide with each other, and determining the distance from the external object 91 to the user's eyes 8 in accordance with the moving distance of the contour image, wherein the contour images are obtained by performing a contour process on two images acquired at the same time by the two image acquisition units.

Preferably, the step of adjusting, by the image adjusting unit 2, the display image in accordance with the analysis result of the image analysis unit 3 comprises: adjusting the object distance of the display image 92 with respect to the user's eyes 8 in accordance with the analysis result of the image analysis unit 3 by the image adjusting unit 2 so that the object distance of the display image 92 with respect to the user's eyes 8 is equal to the distance from the external object 91 to the user's eyes 8.

Preferably, the step of adjusting, by the image adjusting unit 2, the display image in accordance with the analysis result of the image analysis unit 3 comprises: adjusting the position (i.e., position of the display image 92 in an "up, down, left or right" direction in a plane with a same distance from the user's eyes 8) of the display image 92 in accordance with the analysis result of the image analysis unit 3 by the image adjusting unit 2.

It should be understood that, the above embodiments are only used to explain the principle of the present invention, but not to limit the present invention. A person skilled in the art can make various modifications and improvements without departing from the spirit and essence of the present invention, and these modifications and improvements are also considered to be within the protection scope of the present invention.

The invention claimed is:

1. An open head mount display device, comprising:
a display for providing a display image to user's eyes;
a camera for acquiring an image of a real world object;
an image analyzer for analyzing and determining a distance and an angle of the real world object relative to the user's eyes in accordance with the image acquired by the camera so as to determine an angle between sight lines of the user's eyes; and
an image adjustor for adjusting positions of images for the user's left and right eyes respectively in accordance with the angle between the sight lines of the user's eyes, so that the positions of the images for the user's left and right eyes match the angle between the sight lines of the user's eyes, and the images for the user's left and right eyes are treated as the display image by the user's brain without a ghost.

2. The open head mount display device of claim 1, wherein,
two cameras are provided for acquiring images in a same direction; and
the image analyzer is used for superimposing two contour images with each other in specific positions, then moving at least one of the contour images so that contours of the same real world object in the two contour images coincide with each other, and determining a distance from the real world object to the user's eyes in accordance with a moving distance of the contour image, wherein the contour images are obtained by performing a contour process on two images acquired at the same time by the two cameras.

3. The open head mount display device of claim 1, wherein, the camera directly acquires the image of the real world object.

4. The open head mount display device of claim 1, further comprising a reflection unit for reflecting the display image generated by the display into the user's eyes, wherein, the reflection unit comprises a transflective lens provided in front of the user's eyes.

5. The open head mount display device of claim 4, wherein the camera acquires an image of the real world object reflected by the transflective lens.

6. The open head mount display device of claim 1, wherein,
the camera is provided at each side of the user's eyes or at a position between the user's two eyes.

7. The open head mount display device of claim 1, wherein,
two displays are provided for generating display images entering into user's left and right eyes respectively.

8. A display method of an open head mount display device, wherein in the process of providing a display image to user's eyes by a display, the display method comprises following steps of:
acquiring, by a camera, an image of a real world object;
analyzing and determining, by an image analyzer, a distance and an angle of the real world object relative to the user's eyes in accordance with the image acquired by the camera so as to determine an angle between sight lines of the user's eyes; and
adjusting, by an image adjustor, positions of images for the user's left and right eyes respectively in accordance with the angle between the sight lines of the user's eyes, so that the positions of the images for the user's left and right eyes match the angle between the sight lines of the user's eyes, and the images for the user's left and right eyes are treated as the display image by the user's brain without a ghost.

9. The display method of claim 8, wherein:
the step of acquiring, by the camera, the image of the real world object comprises: acquiring images in a same direction at the same time by two cameras;
the step of analyzing and determining, by the image analyzer, the position of the real world object relative to the user's eyes in accordance with the image acquired by the camera comprises: superimposing two contour images with each other in specific positions by the image analyzer, then moving at least one of the contour images so that contours of the same real world object in the two contour images coincide with each other, and determining a distance from the real world object to the user's eyes in accordance with a moving distance of the contour image, wherein the contour images are obtained by performing a contour process on two images acquired at the same time by the two cameras.

10. The open head mount display device of claim 1, wherein,
the image adjustor is further configured to adjust an object distance of the display image with respect to the user's eyes in accordance with an analysis result of the image analyzer so that the object distance of the display image with respect to the user's eyes is equal to a distance from the real world object to the user's eyes.

11. The open head mount display device of claim 1, wherein,
the image adjustor is further configured to adjust a position of the display image to a plane the same distance from the user's eyes as the real world object, in accordance with an analysis result of the image analyzer so that the display image is located beside the real world object.

12. The display method of claim 8, further comprising:
adjusting, by the image adjustor, an object distance of the display image with respect to the user's eyes in accordance with an analysis result of the analyzing so that the object distance of the display image with respect to the user's eyes is equal to a distance from the real world object to the user's eyes.

13. The display method of claim 8, further comprising:
adjusting, by the image adjustor, a position of the display image to a plane the same distance from the user's eyes as the real world object, in accordance with an analysis result of the analyzing so that the display image is located beside the real world object.

* * * * *